(12) United States Patent
Lim

(10) Patent No.: US 6,697,355 B1
(45) Date of Patent: Feb. 24, 2004

(54) METHOD AND APPARATUS FOR COMMUNICATION USING A MOBILE INTERNET IN A MOBILE COMMUNICATION NETWORK

(75) Inventor: Byung Keun Lim, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/190,613

(22) Filed: Nov. 12, 1998

(30) Foreign Application Priority Data

Dec. 31, 1997 (KR) .............................. 97/80744

(51) Int. Cl.[7] .............................................. H04L 12/66
(52) U.S. Cl. ...................... 370/352; 370/338; 370/400; 370/401; 455/433; 455/435
(58) Field of Search ................................ 370/252, 329, 370/338, 390, 400, 401, 402, 432, 466, 469, 474, 349, 352; 455/433, 435

(56) References Cited

U.S. PATENT DOCUMENTS

| | | | |
|---|---|---|---|
| 5,835,720 A | * 11/1998 | Nelson et al. | ......... 395/200.54 |
| 5,956,331 A | * 9/1999 | Rautiola et al. | ............ 370/338 |
| 5,978,386 A | * 11/1999 | Hamalainen et al. | ....... 370/466 |
| 6,052,369 A | * 4/2000 | Hamalainen et al. | ....... 370/389 |
| 6,115,385 A | * 9/2000 | Vig | ............................. 370/401 |
| 6,137,791 A | * 10/2000 | Frid et al. | .................... 370/352 |
| 6,154,461 A | * 11/2000 | Sturniolo et al. | ........... 370/401 |
| 6,215,779 B1 | * 4/2001 | Bender et al. | .............. 370/338 |
| 6,223,035 B1 | * 4/2001 | Pierce et al. | ................. 455/433 |
| 6,230,012 B1 | * 5/2001 | Wilkie et al. | ................ 455/435 |
| 6,519,248 B1 | * 2/2003 | Valko | .......................... 370/352 |
| 2001/0002198 A | * 9/1997 | Lindgren et al. | ........... 370/466 |

* cited by examiner

Primary Examiner—Hassan Kizou
Assistant Examiner—Saba Tsegaye
(74) Attorney, Agent, or Firm—Fleshner & Kim, LLP

(57) ABSTRACT

Mobile Internet system and method in a mobile communication network is disclosed, in which a mobile host given an Internet Protocol address uses an existing Code Division Multiple Access type mobile network and an Home Location Register and an Inter-Working Unit in a personal communication system network to establish communications without restricting a mobile host to a particular network. The mobile Internet system and method includes a plurality of mobile hosts, a plurality of mobile access points, a mobile router, and a plurality of gateway routers.

22 Claims, 5 Drawing Sheets

METHOD AND APPARATUS FOR COMMUNICATION USING A MOBILE INTERNET IN A MOBILE COMMUNICATION NETWORK

BACKGROUND OF THE INVENTION

1. Field of the Invention

The present invention relates to a mobile Internet in a mobile communication network, and more particularly to mobile Internet using an existing Code Division Multiple Access type mobile communication network and a personal communication system network.

2. Discussion of the Related Art

Generally, the Internet is a data communication network by which data is exchanged based on the Transmission Control Protocol (TCP) and Internet Protocol (IP) between a plurality of networks, each network having an identifying IP address, and a plurality of hosts, each host holding the IP addresses of the networks. Usually, a host is a computer having a communication modem or a computer connected to a telephone, and can communicate with only the networks at particular IP addresses given to the host unit.

In the past, data communications through the Internet have mostly been with stationary hosts. However recently, a rapid development of the communication and electronic industries has given rise to a mobile IP in which a host is a telephone and a portable computer and can provide Internet service out of their own networks. Up until now, the mobile IP technology of the Internet Engineering Task Force (IETF) adds a mobility agent system to each communication network as well as a communication protocol between the mobile host and the mobile agent system.

Therefore, the data communication network through the Internet requires the mobility agent system, a plurality of hosts connected to a plurality of networks, and the Internet connected to each of the networks. When a mobile host holding a particular IP address of a network moves to another network, the applicable mobile agent system manages the information on the movement of the mobile host and the present IP address. Specifically, a data communication is made using a communication protocol added between the mobile host and the mobile agent system.

Depending on the function, the mobile agent system is divided into the home agents and the external agents. The home agent manages the IP addresses of the hosts registered in the home agent's own networks, such as the Local Area Network (LAN) or the Wide Area Network (WAN). Also, when the mobile host moves from its home network to another network, the home agent registers the IP address of the network to which the mobile host is temporarily connected as a "care of address." If the original IP address of the mobile host receives data, the home agent delivers the data to the care of address where the mobile host is temporarily located at the time.

On the other hand, the external agent manages the address and location of a mobile host from an external network which has temporarily connected to a particular IP address in the external agent's network. When a mobile host is out of its home network and makes a temporary connection to an external network, the mobile agent in the home network delivers the data received at an IP address of the mobile host in the home network to the particular address in which the mobile host is located within the external network.

To implement a mobile IP, a mobile agent in a home network broadcasts its current location to a mobile host in the home network. Also, if an IP datagram comes in at an IP address in the originally registered home network while the mobile host is connected to an external network, the mobile agent delivers the IP datagram by a tunneling system to the mobile host temporarily connected to the external network.

FIG. 1 illustrates an existing data communication network connection in the Internet, including hosts having its own IP address, routers, and mobile agents. According to the existing TCP/IP standards, the mobile host HT11, registered in the LAN/WAN1 network, can communicate with the host HT13, registered in the LAN/WAN3, through the routers RT31 and RT33 via the Internet 400. However, if the mobile host HT11 moves out of its home network LAN/WAN1 into an external network, delivering an IP datagram from HT11's own IP address becomes more complicated.

For example, if the mobile HT11 connects to a location of a mobile host HT12 in the LAN2 network, the mobile HT11 receives a broadcasted information from the mobile agent AT22 indicating HT11's location in the external network LAN2 to which a mobile IP service can be provided by establishing an IP address to which the mobile HT11 is temporarily connected as a care of address. Afterwards, the mobile host HT11 registers the care of address in its own home agent AT21 through the Internet 400. When another host HT13 from an external network LAN/WAN3 provides a datagram to a particular IP address of the host HT11 in the home network LAN/WAN1, the home agent AT21 receives and delivers the IP datagram to the registered care of address, i.e., the location of the mobile host HT12 in the external network LAN2. Thus, even after moving to an external network LAN2, the mobile host HT11 receives all data from its own IP address.

Thus, the mobile host HT11 temporarily connected to the mobile host HT12 in the external network LAN2 may transmit a datagram to the stationary host HT13. While a mobile host can call a stationary host through the Internet, a stationary host cannot call a mobile host through the Internet. Moreover, the mobile host HT11 need not communicate with the stationary host HT13 using the mobile IP system as described above, but may use the existing TCP/IP protocol. However, the existing TCP/IP protocol additionally requires the capacity to implement the tunneling system and the mobile agent for each network. Also, the mobile agent system must be newly implemented to the network itself.

Furthermore, as discussed above, when a mobile host moves from the home network to an external network and after temporarily connecting to the external network, the mobile host receives a broadcasted information from the mobile agent identifying the mobile host's present location in the external network. The mobile host then establishes the actual IP address to which the mobile host is temporarily connected as a care of address. However, making a connection to an external network and establishing a care of address may significantly degrade the security of communication.

SUMMARY OF THE INVENTION

An object of the present invention is to solve at least the problems and disadvantages of the related art.

Accordingly, an object of the present invention is to provide a system and method for a mobile Internet using the existing CDMA or FDMA type of mobile communication network.

Another object of the present invention is to provide a mobile Internet system and method in a mobile communication network which allows a continual mobile IP service without disconnection when a mobile station moves among adjacent cells.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the mobile Internet in a mobile communication network includes a plurality of mobile hosts each providing a mobile data communication service and a radio access; a plurality of radio mobile access points each providing a radio communication channel to the mobile host; a mobile router connected to each of the plurality of mobile access points exchanging a radio data packet among the mobile hosts, managing a location and registry of the mobile hosts, and conducting a radio access between the mobile host and the radio mobile access point; and a plurality of gateway routers each connected between the mobile router and a stationary Internet which is connected to other mobile Internet networks.

According to the present invention, a mobile IP service is allowed using an existing Internet protocol with the installed application program. Also, a high quality service is provided in which a call is not disconnected even during the movement of a mobile station among adjacent cells. Furthermore, the present invention can be implemented without the addition of a mobile agent system and a new protocol to the existing CDMA type mobile telephone network and personal communication network.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

In a CDMA mobile communication system, the technical standards for radio access includes IS-95, IS-99, IS-657, IS-658, and IS-707. Accordingly, a radio data communication service based on a mobile host of a telephone and data terminal station operates by the access standards of the CDMA mobile communication system. Also, the asynchronous circuit data, the facsimile service, and the radio packet data service are each regulated by the access standards. Moreover, the access standards provide regulations for an Inter-Working Unit (IWU) to correlate the wire and wireless data communication protocols.

Through the CDMA access standards, a mobile station can transmit asynchronous circuit data and facsimile as well as access transmission by the radio packet data service. However, a call via the Internet from a host in a stationary Internet to a mobile host at an IP address cannot be made using only the existing standards. Thus, additional access standards are necessary. Also, the standards for data communication to transmit and receive data between two mobile stations without the IWU has not yet been established.

Figure 1:
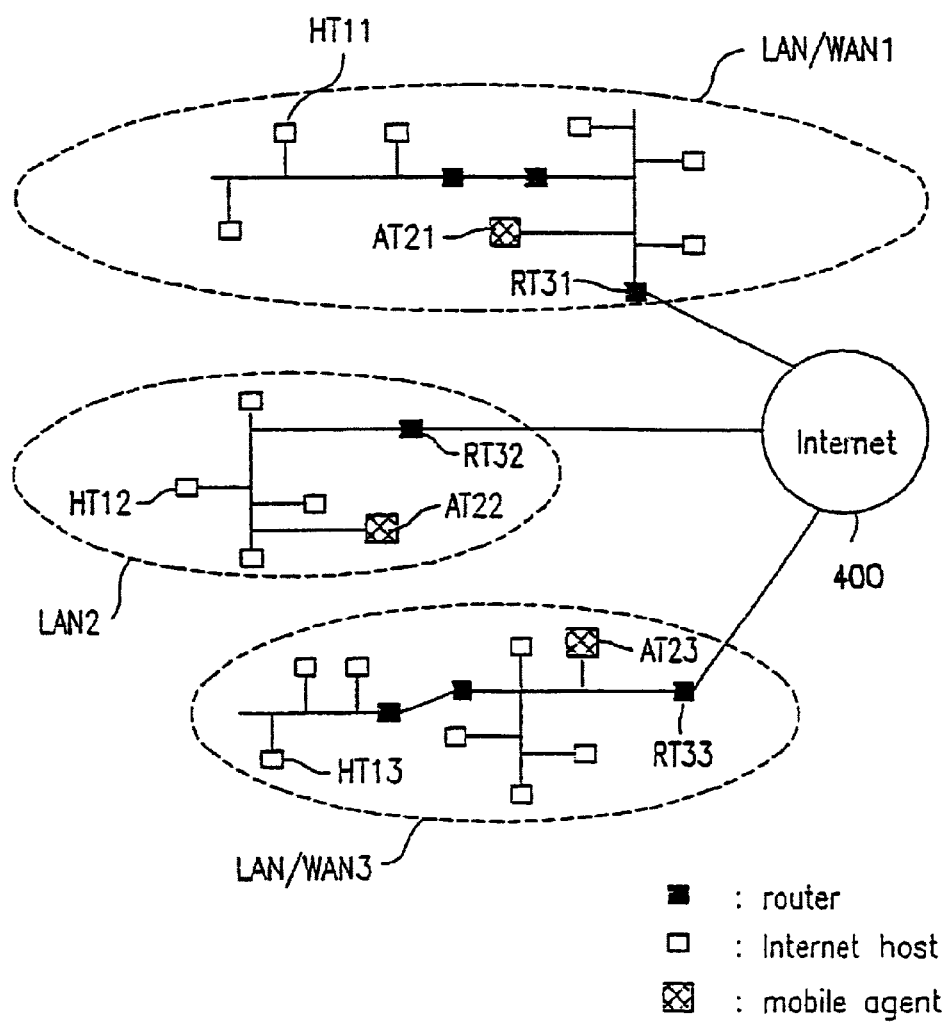
FIG. 1 illustrates a data communication network connection to an Internet in the background art.
Figure 2:
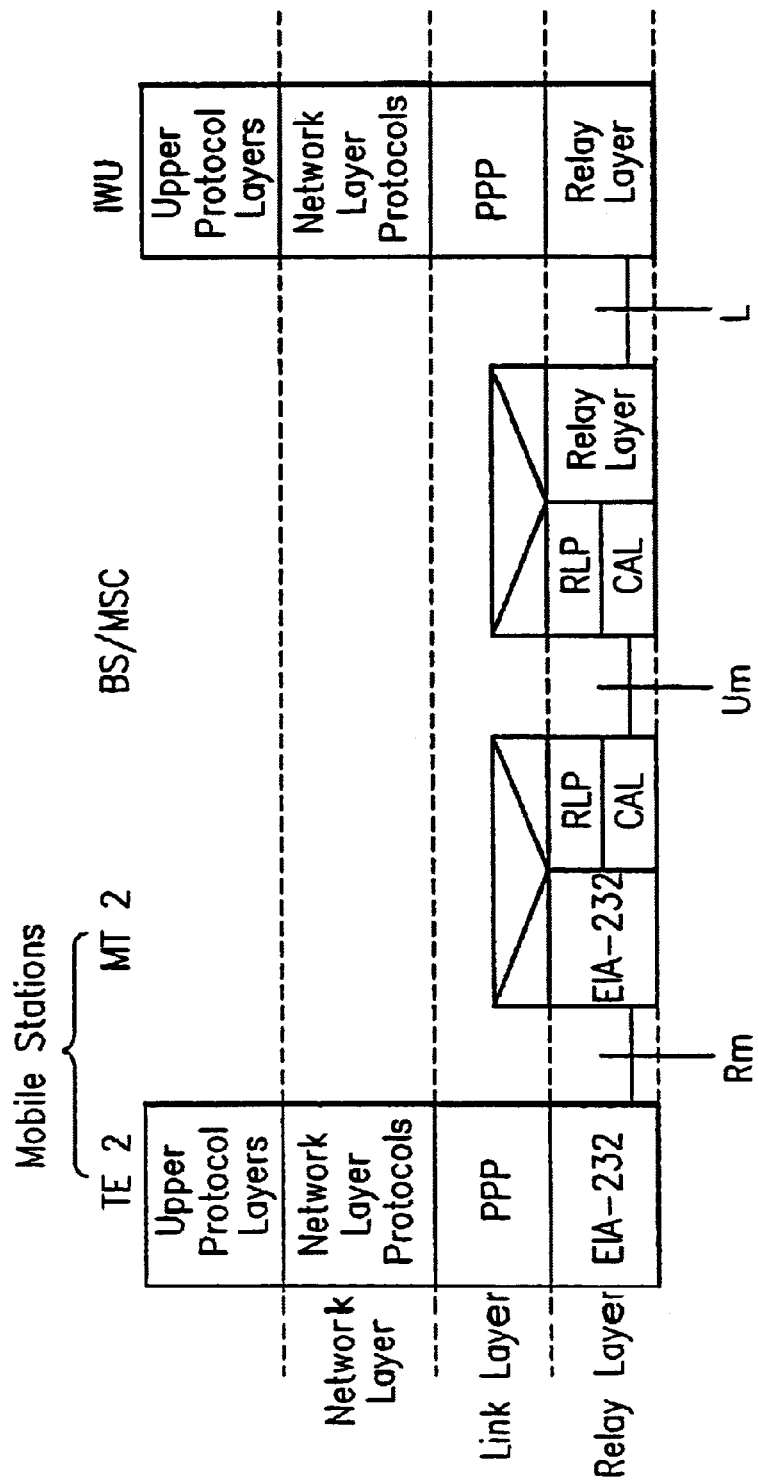
FIG. 2 illustrates a radio packet data protocol stack used during a communication between a mobile host and a host in a stationary Internet based on a CDMA mobile communication.

An access method by a radio data communication via a stationary Internet to a stationary host to transmit a radio packet will be explained with reference to FIG. 2. Referring to FIG. 2, an IS-657 packet type of data communication protocol stack has a path through which a communication to a stationary host (not shown) can be made from a mobile host TE2, MT2 and an IWU. As a link Point to Point Protocol (PPP) shows, if a data terminal station TE2 sets a service option to a packet service mode, the station TE2 maintains connection to the IWU through a base station BS and a mobile switching center MSC via the mobile station MT2. Once connected, the IWU assigns an Internet IP address from a subnetwork IP of the IWU to the data terminal station TE2 to transmit an IP datagram to the stationary Internet IP address. Afterwards, the upper layer TCP and the network layer IP of the data packet protocol are opened, allowing communication between the mobile station TE2 and the host in the stationary Internet.

If a host in the stationary Internet calls the data terminal station, the call signal is transmitted to the IWU through the appropriate base station and mobile switching center. However, a method for identifying the data terminal station with an IP address in the IWU has not been established. Accordingly, the present invention provides a mobile Internet in a mobile communication network which allows a call to a mobile station or a data terminal station by an Internet IP address, and data communication between mobile stations without the IWU.

Figure 3:
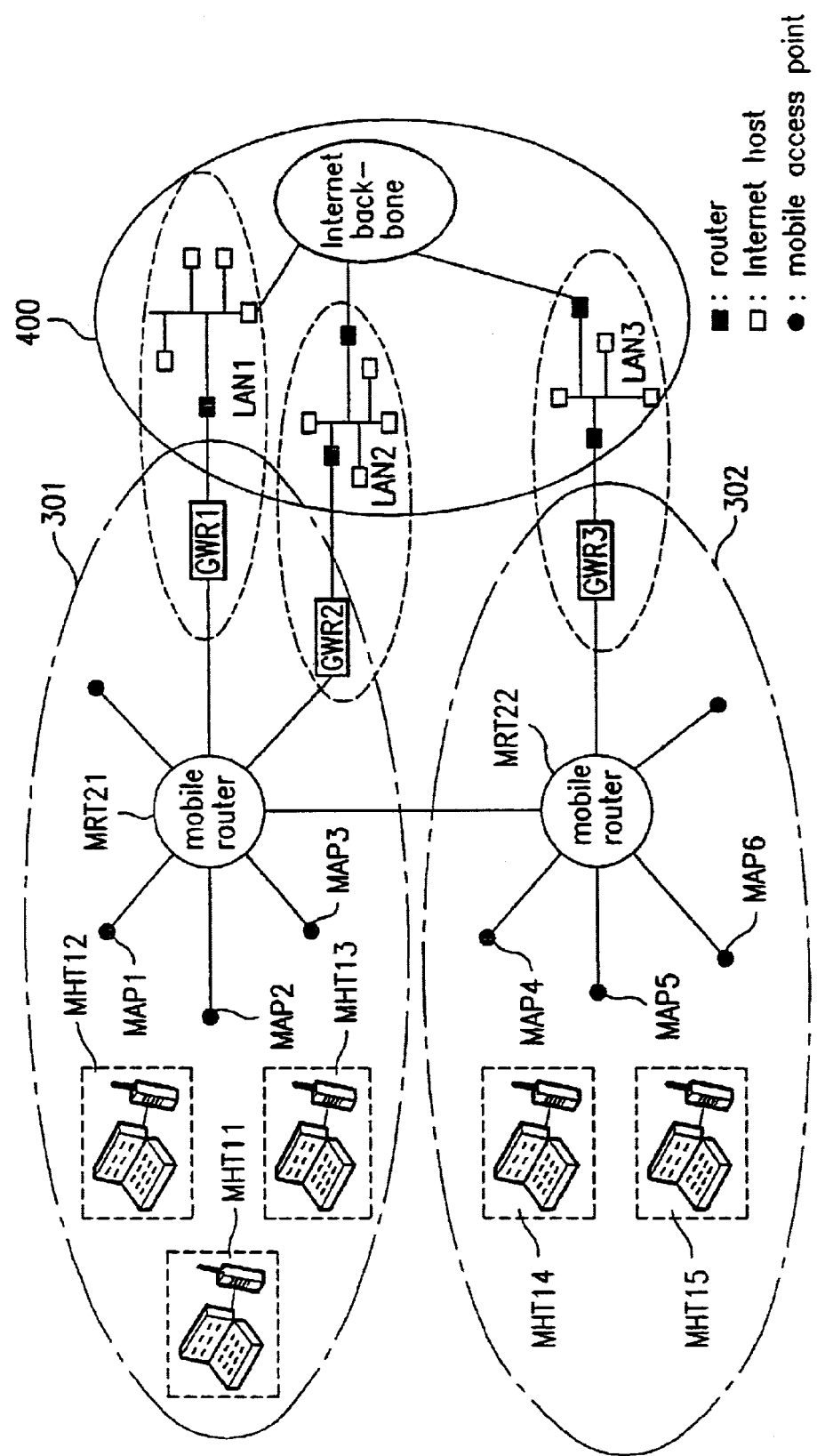
FIG. 3 illustrates a mobile Internet data communication network connection according to the present invention.

FIG. 3 shows an embodiment of a mobile Internet in a CDMA type mobile communication network according to the present invention. A mobile internet 301 includes a plurality of mobile hosts MHT11–13 each capable of providing a mobile data communication service and a radio access; a plurality of mobile access points MAP1–3 each providing a radio communication channel to the mobile hosts MHT11–13; a mobile router MRT21 connected to each of the plurality of mobile access points MAP1–3, exchanging radio data packets among the mobile hosts MHT11–13, managing a location and registry of the mobile hosts MHT11–13, and regulating a radio access between the mobile hosts and the mobile access point; and a plurality of gateway routers GWR1–2 each connected between the mobile router MRT21 and a stationary Internet 400. The stationary Internet 400 is also connected a gateway router GWR3 of a mobile internet 301 including mobile hosts MHT14–15; mobile access points MAP4–6; and a mobile router MRT22.

Each of the gateway routers has a network ID forming a subnetwork of the Internet 400 to register and manage the mobile host IDs under its network ID in the mobile router. Also, the gateway routers GWR1–2 implement a data communication protocol using the mobile internet 301, and using a mobile host ID of its subnetwork ID, provides mobile Internet protocol service to the mobile host having the Internet IP address. Likewise, gateway router GWR3 implements a data communication protocol using the mobile Internet 302, and using a host ID of its subnetwork ID, provides mobile Internet protocol service to the mobile host having the Internet IP address.

Figure 4:
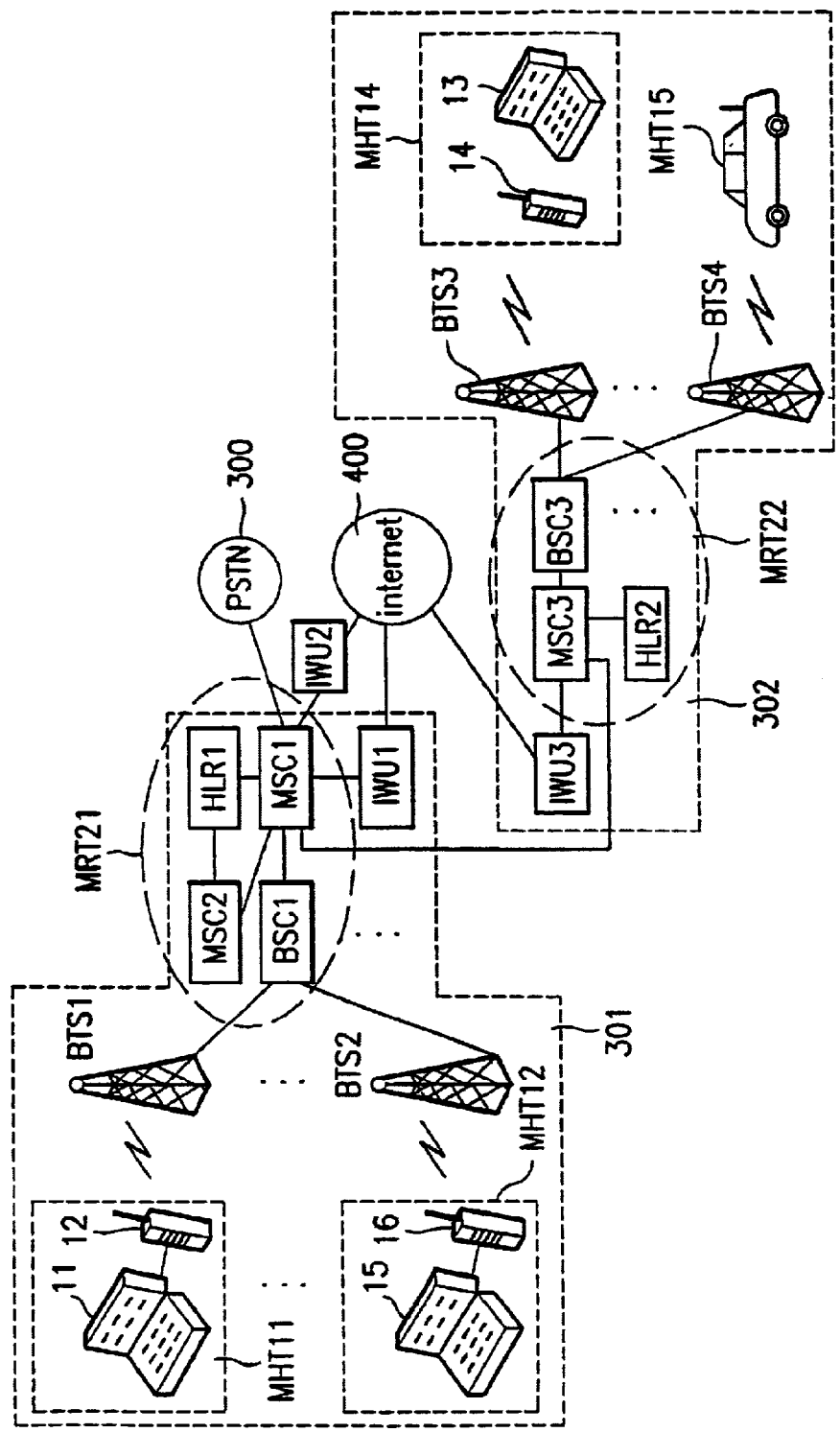
FIG. 4 illustrates a another preferred embodiment of a mobile IP network using a CDMA type mobile communication network and a personal communication system network of the system shown in FIG. 3.

As shown in FIG. 4, the mobile hosts MHT11–13 includes a data terminal station such as a notebook computer, a personal digital assistant (PDA), a laptop computer, a palmtop computer, a portable computer or a mini-computer coupled with a mobile station such as a cellular phone. Also, the mobile access points MAP1–3 may be base stations and the mobile router may include at least one host location register HLR1 to manage the location and registration of the mobile hosts; a plurality of mobile switching centers MSC1–2, each exchanging a radio data packet among the mobile hosts MHT11–13; and a plurality of base station controllers BSC1, each controlling a radio access of the mobile host MHT11–13 to the mobile access points MAP1–3.

The Internet gateway routers GWR1–2 may include the IWU1 and IWU2. As a subnetwork connected to the Internet 400 and the mobile switching center MSC1, the IWU1 has a plurality of mobile host Identifiers (ID) having an IP address which are assigned to the data terminal stations 11, 15 of the mobile hosts 12, 16 which are registered in the HLR1. The mobile identification numbers (MIN) of the mobile stations 12, 16 corresponding to the data terminal stations 11, 15 are also registered in the HLR1. Specifically, the host IDs with the IP addresses assigned to the data terminal stations are registered in the HLR and the MIN of the mobile stations corresponding to the data terminal stations are registered in the IP addresses which has the host IDs assigned to the data terminal stations. Each mobile hosts MHT11–13 in the internet 301 has a host ID which belongs to the subnetwork ID of the gateway routers GWR1–2 and the gateway routers GWR1–2 are registered in the mobile router MRT21.

A plurality of inter-working units IWU1–3 and mobile switching centers MSC1–3 may be connected to one HLR1. However, the mobile hosts, namely the data terminal stations 11, 15 connected to mobile stations 12, 16, need not be connected continually to host IDs with an IP address. Instead, the host IDs are assigned to the mobile hosts within the limit which the IWU1 can accommodate. Moreover, only the host IDs within the subnetwork ID of the IWU1 connected to the network 301 managed by the HLR1 can be assigned to the mobile hosts registered in the HLR1.

Referring back to FIG. 3, the mobile internet 301, to which the mobile router MRT21 and mobile hosts MHT11–13 are registered, is a home network of the mobile hosts MHT11–13. The mobile Internet 302, to which the mobile router MRT21 and the mobile hosts MHT11–13 is not registered, is an external network of the mobile hosts MHT11–13. Also, the gateway routers GWR1–2 having a subnetwork ID containing the mobile host IDs are called home gateway routers of the mobile hosts.

A preferred embodiment of an IP communication service in a CDMA type mobile communication network will be further explained with reference to FIGS. 3 and 4. The home network of the mobile hosts MHT11–13 is the mobile internet 301. The home gateway router of the mobile host MHT11 is the GWR1 and the home gateway router of mobile host MHT12 is the GWR2. Also, the home network and home gateway router of mobile host MHT14 are the mobile Internet 302 and the GWR3, respectively.

COMMUNICATION BETWEEN A MOBILE HOST AND A HOST IN A STATIONARY Internet

When the mobile host MHT11 in the mobile Internet 301 communicates with a host in a stationary Internet 400, all data received at the IP address of the MHT11 or transmitted by the MHT11 is through the home gateway router GWR1. Thus, the GWR1 regulates all communications regardless of whether the host (not shown) in the stationary Internet 400 is LAN1, LAN2, LAN3, or another LAN and whether the MHT11 is in the home network 301 or an external network 302.

If a mobile host MHT11 initiates a call to a host in the stationary Internet 400 by a packet data service mode without designating a mobile Internet, the mobile router MRT21 identifies the home mobile network 301 and the home gateway router GWR1 of the MHT11 from its HLR1. Afterwards, the MRT21 connects the MHT11 to the home gateway router GWR1 allowing access to the host in the stationary Internet 400.

If data is transmitted from the stationary Internet 400 to the mobile host MHT11, the stationary Internet 400 sends all IP data to the gateway router GWR1 of the mobile host MHT11. The GWR1 requests the home mobile router MRT21 to establish a call to the MHT11 at a specific IP address. By the IP address, the home mobile router MRT21 identifies the location of the MHT11. If MHT11 is within the home network 301, the MRT21 directly calls MHT11 by a packet data service option. However, if the MHT11 has moved and is temporarily connected to the location of the mobile host MHT14 in the external network 302, the MRT21 first connects with the mobile router MRT22 through a circuit connecting the external network 302. After connection, MRT21 calls the MHT11 by a packet data service option through the mobile access point MAP4 to connect the MHT11 with the GWR1.

Particularly, when a host in the stationary Internet 400 calls an IP address of the mobile host MHT11 in the home network 301, a call signal is sent to the mobile switching center MSC1 through the Internet 400 and the IWU1. At this point, the radio communication service option is already set to a packet service mode. Specifically, the IWU1 uses the data terminal station ID of the mobile host MHT11 rather than the MIN for requesting the mobile switching center MSC1 to establish a call to the MHT11. The HLR1 identifies a location of the mobile station 12 from the MIN registered with the IDs of the mobile host MHT11 and calls the MHT11 by a packet service to establish a packet data path between the host in the stationary Internet 400 and the MHT11.

However, if the mobile host MHT11 has moved from the home network 301 to a location of the mobile host MHT14 in the external network 302, the mobile switching center MSC1 cannot directly establish a connection between the stationary Internet 400 and the mobile host MHT11. A data path must first be established between the mobile switching centers MSC1 in the home network and MSC3 in the external network. When a data packet service option is chosen to transmit data to the MHT11, the Internet IP datagram received by the IWU1 in the home network 301 is forwarded to the mobile switching center MSC1 which is connected to MSC3. From the MSC1, the data is sent to the location of the mobile host MHT14 where the MHT11 is temporarily connected via the MSC3, the base station controller BSC3, and the base station BTS3. Particularly, the MSC1 calls the MIN of the mobile station 12 identified by the HLR1 through the MSC3 and also informs MSC3 that the service option is a packet mode.

Moreover, if the mobile host MHT11 has moved from the home network 301 to the location of the mobile host MHT14 in the external network 302, a call from MHT1 to a host in the stationary Internet 400 is also established by connecting to the MSC1 in the home network 301 through the MSC3.

When the MHT11 requests a packet service option after moving to the external network 302 and making a temporary connection to the mobile host MHT14, the MSC3 connects a call pathway to the MSC1 in the home network 301 of the MHT11. The MSC3 also informs the MSC1 the MIN of the MHT11 and that the service option is a packet service mode without specifying the call receiver's number. The MSC1 can obtain the ID of the mobile host MHT11 from the MINs registered in the HLR1 and from the ID, the subnetwork IWU1 of the MHT11 is identified to establish a call between the MHT11 and the stationary Internet 400.

Thus, by utilizing the mobile host ID, the mobile host MHT11 can communicate to any host in a stationary Internet 400 from anywhere within the service regions of the personal communication and mobile communication network in which a radio data communication service is capable. Also, the mobile station can be provided with a continuous service of calls even when the mobile station moves among adjacent cells.

COMMUNICATION BETWEEN TWO MOBILE HOSTS

A communication between two mobile hosts occurs when a mobile host MHT11 calls, by a packet service option, a MIN of another mobile host MHT12 regardless of whether the MHT11 is within the home network 301 or the external network 302. A call to the MHT12 is established by a packet service option after the mobile router MRT21 of the MHT11 determines the data service and the registered location of the MHT12. Also, a call can be established simply by the mobile IP address assigned to the mobile Internet 301 without the mobile host ID in the subnetwork ID of the gateway router GWR1. The mobile IP address is distinct from the gateway router subnetwork address and cannot be used for Internet communication through the gateway router.

Figure 5:
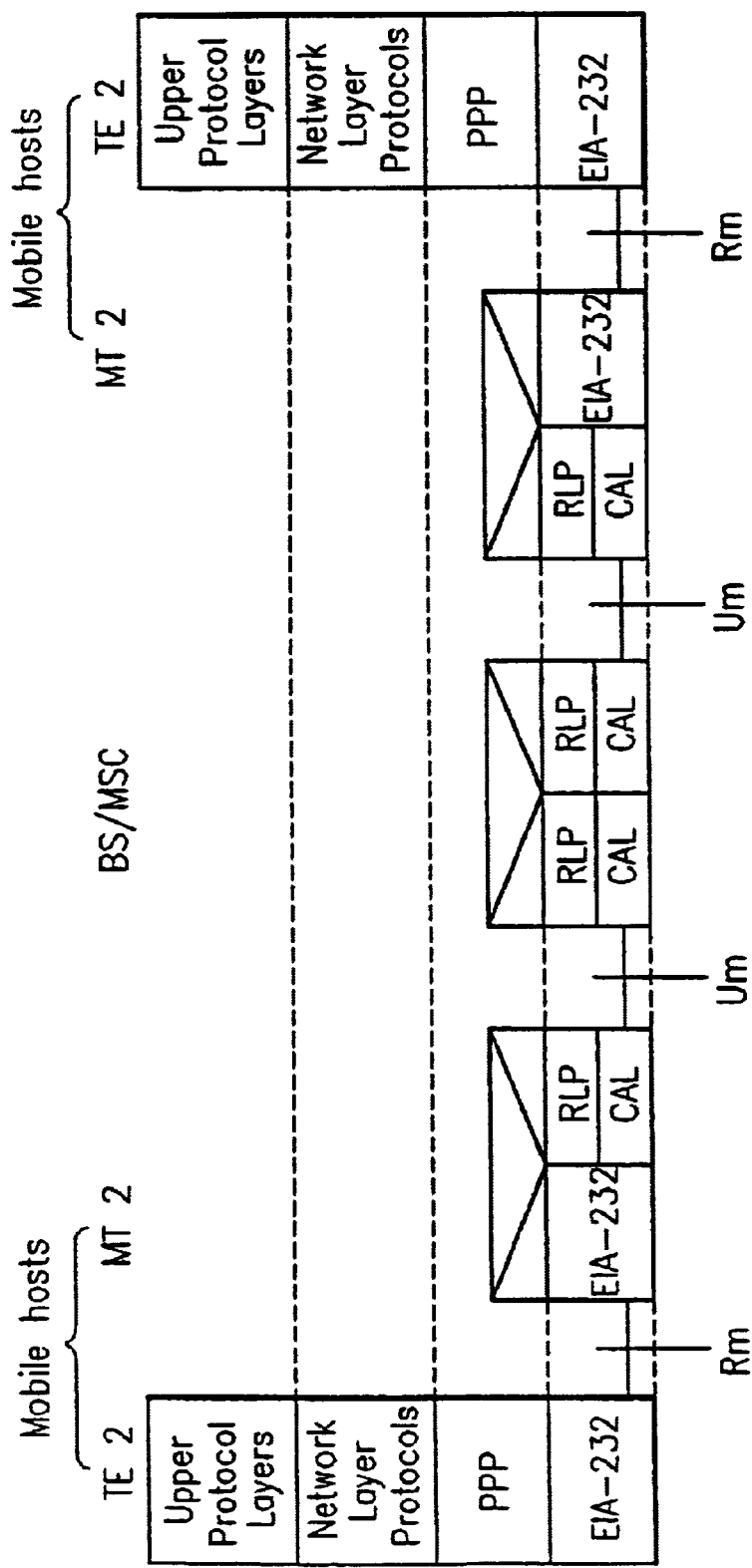
FIG. 5 illustrates a radio packet data protocol stack used during communication between mobile hosts in a mobile Internet according to the present invention.

Referring to FIG. 4, a communication between two mobile hosts within the home network 301 will be described. The mobile host MHT11 of the home network 301 sets the service option to a packet data service mode through the mobile station 12 and initiates a call to the mobile host MHT12. If the MHT11 does not specify the MIN of the MHT12 as the receiver of the packet data service, the MHT11 is connected to the IWU1 to determine the location of the MHT12. However, if the MIN of the MHT12 is designated, a request to establish a communication between the MHT11 and MHT12 is sent to the mobile switching center MSC1. The MSC1 and the HLR1 calls the MHT12 by the MIN and the MHT12 is informed of a packet service option. Afterwards, the PPPs of both mobile hosts are set and the upper protocol layers are opened to allow a packet data communication between the MHT11 and MHT12. FIG. 5 shows a radio packet data protocol stack used during communication between two mobile hosts according to the present invention. Particularly, the mobile router of the caller opens the radio link protocol (RLP) and the mobile router of the receiver opens the RLP. Afterwards, the PPP, the newtwork layer and the upper layers are opened allowing communication between two mobile stations within the same network.

Also referring to FIG. 4, a communication form a mobile host in the external network 302 will be described. If the mobile host MHT11, which has moved from the home network 301 to the external network 302, initiates a call to the mobile host MHT12, the path of the connection established by the mobile switching station MSC1 and the HLR1 is the same as the case when the MHT12 is called from the IWU1. Particularly, a communication pathway between the MHT11 and MHT12 is mainly established through the mobile switching center MSC3 of the external network 302. In providing the a service to the MHT11, the IWU1 merely allows access to the HLR1 for the identification of the MHT11.

By assigning a particular Internet IP address, each mobile station provides continual communication services to a mobile host within the service region as well as a stationary host in the Internet. Also, data communication between two mobile hosts within the radio mobile data communication service region is established by a mobile switching center in the external network, independently from the IWU, using a mobile IP address or MIN. Thus, a mobile Internet service is provided utilizing a CDMA type mobile communication network, basic elements of a personal communication network, and the existing Internet communication protocol without changing the application programs and without the addition of a mobile agent system. Accordingly, a commercial application of the mobile Internet is easily implemented without an addition of a mobile communication protocol while improving a communication network security.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A mobile Internet, comprising:
    a plurality of mobile hosts;
    a first data interfacer which exchanges data packets among said mobile hosts; and
    a first gateway router connected between said data interfacer and a stationary Internet and having an identifier corresponding to a subnetwork of the stationary Internet, each of said mobile hosts having a mobile identification number (MID) and mobile host identifier (ID) which corresponds to an IP address within the subnetwork of the first gateway router, said first data interfacer managing locations and registering the mobile identification number (MID) and mobile host identifier (ID) of each of said mobile hosts wherein the subnetwork corresponds to a home network which includes the first gateway router, said first data interfacer, and at least a portion of said mobile hosts;
    a second gateway router having an identifier which corresponds to an external subnetwork of the stationary Internet; and
    a second data interfacer connected to the second gateway router, wherein at least one of said mobile hosts is located in an area corresponding to the external subnetwork but is not registered in said second data interfacer, wherein if the mobile host in the external subnetwork initiates a call to a mobile host in the home network, the first gateway router requests said first data interfacer to establish a communication path to the mobile host in the home network, said first data interfacer establishing said communication path based on the IP address of the mobile host identifier (ID) corresponding to the mobile host in the home network.

2. A mobile Internet of claim 1, wherein said first data interfacer comprises:
    a plurality of mobile access points, each providing a radio communication channel to said mobile hosts; and a mobile router connected to each of said mobile access points allowing exchange of data packets by controlling radio access between said mobile access points and said mobile hosts, said mobile router further managing locations of said mobile hosts by registering the mobile identification number (MID) and mobile host identifier (ID) of each of said mobile hosts and providing radio Internet protocol service to said mobile hosts using the IP addresses indicated in the mobile host identifiers.

3. A mobile Internet of claim 2, wherein each of said plurality of mobile access points comprises a base station.

4. A mobile Internet of claim 2, wherein said mobile router comprises:
   a plurality of mobile switching centers, each allowing exchange of data packets among said plurality of mobile hosts;
   a plurality of base station controllers, each controlling the radio access between said plurality of mobile access points and said plurality of mobile hosts; and
   at least one HLR managing the location of said plurality of mobile hosts by registering said assigned identifiers in said HLR.

5. A mobile Internet of claim 1, wherein each of said mobile hosts comprises a data terminal station and a corresponding mobile station.

6. A mobile Internet of claim 5, wherein each of said mobile hosts includes a data terminal station and a mobile station, and wherein the IP address included in the mobile host identifier (ID) of each of said mobile hosts is assigned to the data terminal station and the mobile identification number (MID) is assigned to the mobile station.

7. A mobile Internet of claim 5, wherein said data terminal station may be a notebook computer, a personal digital assistant, a laptop computer, a palmtop computer, a portable computer, or a mini-computer.

8. A mobile Internet of claim 1, wherein if the mobile host in the home network calls the mobile host in the external subnetwork, a mobile router included in the first data interfacer establishes a data path between the mobile hosts based on an IP address from a mobile identification number (MID) corresponding to the second mobile host.

9. A mobile Internet of claim 1, wherein the first gateway router includes an Inter-Working Unit.

10. A mobile Internet of claim 9, wherein said Inter-Working Unit has a plurality of identifiers indicating an IP address and assigned to said plurality of mobile hosts.

11. A mobile internet of claim 1, wherein said first data interfacer includes a mobile router which establishes said communication path.

12. A mobile Internet comprising:
   a plurality of mobile hosts;
   a first data interfacer which exchanges data packets among said mobile hosts; and
   a first gateway router connected between said data interfacer and a stationary Internet and having an identifier corresponding to a subnetwork of the stationary Internet, each of said mobile hosts having a mobile identification number (MID) and mobile host identifier (ID) which corresponds to an IP address within the subnetwork of the first gateway router, said first data interfacer managing locations and registering the mobile identification number (MID) and mobile host identifier (ID) of each of said mobile hosts,
   wherein if a first one of said mobile hosts located in the subnetwork calls a second one of said mobile hosts located in an external subnetwork, a mobile router included in the first data interfacer establishes a data path with a mobile router in the external subnetwork to connect the first and second mobile hosts based on the mobile identification number (MID) of the second mobile host, wherein said data path does not pass through the stationary Internet.

13. A communication method in a mobile communication network having a plurality of mobile hosts capable of mobile data communication service, a mobile router, and a plurality of gateway routers, said method comprising:
   assigning identifiers indicating an IP address within a stationary Internet to each of said plurality of mobile hosts, said identifiers belonging to one of said plurality of gateway routers;
   managing the location of said plurality of mobile hosts by registering said assigned identifiers in the mobile router; and
   providing a radio Internet protocol service to said plurality of mobile hosts using an IP address indicated by said identifiers, wherein
   said identifier of said plurality of gateway routers comprises a host ID indicating an IP address assigned to a data terminal station and a mobile identification number assigned to the mobile host;
   a first subnetwork ID having a first gateway router connected to a first mobile router to which an identifier of a mobile host is registered is determined as a home network, and a second subnetwork ID having a second gateway router connected to a second mobile router to which an identifier of a mobile host is not registered is determined as an external network;
   if one host in the stationary Internet calls a mobile host in the home network, a gateway router of the home network requests a first mobile router of the home network to establish a call to said mobile host; and
   said first mobile router identifies the IP address of said mobile host from a host ID assigned to the data terminal station of said mobile host, and establishes a data path between said one host and said mobile host.

14. A method of claim 13, further comprising:
   forming a plurality of subnetwork IIDs wherein each subnetwork ID includes one of said plurality of gateway routers and the IP addresses indicated by the identifiers belonging to said one of said plurality of gateway routers.

15. A method of claim 14, wherein each of said plurality of mobile host comprises a data terminal station and a corresponding mobile station.

16. A communication method in a mobile communication network having a plurality of mobile hosts capable of mobile data communication service, a mobile router, and a plurality of gateway routers, said method comprising:
   assigning identifiers indicating an IP address within a stationary Internet to each of said plurality of mobile hosts, said identifiers belonging to one of said plurality of gateway routers;
   managing the location of said plurality of mobile hosts by registering said assigned identifiers in the mobile router; and
   providing a radio Internet protocol service to said plurality of mobile hosts using an IP address indicated by said identifiers, wherein
   said identifier of said plurality of gateway routers comprises of a host ID indicating an IP address assigned to a data terminal station and a mobile identification number assigned to the mobile host;

a first subnetwork ID having a first gateway router connected to a first mobile router to which an identifier of a mobile host is registered is determined as a home network, and a second subnetwork ID having a second gateway router connected to a second mobile router to which an identifier of a mobile host is not registered is determined as an external network;

if one host in the stationary Internet calls a mobile host in the external network, a gateway router of the home network requests a first mobile router of the home network to establish a call to said mobile host; and said first mobile router identifies the IP address of said mobile host from a host ID assigned to the data terminal station of said mobile host, and establishes a data path between said one host and said mobile host through a second mobile router of the external network.

17. A communication method in a mobile communication network having a plurality of mobile hosts capable of mobile data communication service, a mobile router, and a plurality of gateway routers, said method comprising:

assigning identifiers indicating an IP address within a stationary Internet to each of said plurality of mobile hosts, said identifiers belonging to one of said plurality of gateway routers;

managing the location of said plurality of mobile hosts by registering said assigned identifiers in the mobile router; and providing a radio Internet protocol service to said plurality of mobile hosts using an IP address indicated by said identifiers, wherein said identifier of said plurality of gateway routers comprises of a host ID indicating an IP address assigned to a data terminal station and a mobile identification number assigned to the mobile host, and if a first mobile host of one subnetwork ID calls a second mobile host of said one subnetwork ID, a mobile router of said one subnetwork ID directly establishes a data path between said first and second mobile hosts by the mobile identification number of the second mobile host corresponding to the data terminal station.

18. The method of claim 17, wherein the step of establishing a data path between said first and second mobile hosts further comprises:

opening a radio link protocol of the first mobile host by the mobile router of said one subnetwork ID; and opening a radio link protocol of the second mobile host by the mobile router of said one subnetwork ID.

19. A communication method in a mobile communication network having a plurality of mobile hosts capable of mobile data communication service, a mobile router, and a plurality of gateway routers, said method comprising:

assigning identifiers indicating an IP address within a stationary Internet to each of said plurality of mobile hosts, said identifiers belonging to one of said plurality of gateway routers;

managing the location of said plurality of mobile hosts by registering said assigned identifiers in the mobile router; and providing a radio Internet protocol service to said plurality of mobile hosts using an IP address indicated by said identifiers, wherein said identifier of said plurality of gateway routers comprises of a host ID indicating an IP address assigned to a data terminal station and a mobile identification number assigned to the mobile host, and if a first mobile host of a first subnetwork ID calls a second mobile host of a second subnetwork ID, a first mobile router of said first mobile host establishes a data path between said first and second mobile hosts through a second mobile touter of said second mobile host by identifying the IP address from the mobile identification number of the second mobile host corresponding to the data terminal station.

20. A packet data communication method, comprising:

associating a mobile host identifier (ID) assigned to a corresponding Internet home subnetwork with a mobile host;

associating a mobile identification number (MIN) assigned to a corresponding Internet visitor subnetwork with the mobile host;

communicating the mobile host ID from an originating host to the Internet home subnetwork corresponding to the mobile host;

determining the particular Internet subnetwork in which the mobile host is located based on the MIN associated with the mobile host;

establishing a circuit between a first mobile router of the Internet home subnetwork and a second mobile router of the Internet visitor subnetwork;

connecting the second mobile router to the mobile host by calling the mobile host from the second mobile router using the associated mobile host ID; and providing packet data service between the originating host and the mobile host through the circuit established between the first and second mobile routers.

21. The method of claim 20, wherein the mobile host ID is an Internet Protocol (IP) address.

22. The method of claim 21, wherein the IP address assigned to the mobile host does not change as the mobile host moves from the Internet home subnetwork to the Internet visitor subnetwork.

* * * * *